(12) United States Patent
Dogariu et al.

(10) Patent No.: US 8,448,460 B2
(45) Date of Patent: May 28, 2013

(54) VEHICULAR COMBINATION CHILLER BYPASS SYSTEM AND METHOD

(75) Inventors: Michael J. Dogariu, Chesterfield Township, MI (US); Christopher C. Nyeholt, Aramada, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1374 days.

(21) Appl. No.: 12/144,385

(22) Filed: Jun. 23, 2008

(65) Prior Publication Data
US 2009/0317697 A1 Dec. 24, 2009

(51) Int. Cl.
*F25D 17/00* (2006.01)
*F25D 17/02* (2006.01)
*F25B 41/00* (2006.01)

(52) U.S. Cl.
USPC ............ 62/179; 62/185; 62/178; 62/201; 62/196.1; 62/259.2

(58) Field of Classification Search
USPC ............ 62/185, 201, 178–179, 196.1, 259.2
See application file for complete search history.

(56) References Cited

U.S. PATENT DOCUMENTS

| | | | | | |
|---|---|---|---|---|---|
| 3,307,368 | A | * | 3/1967 | Harnish | 62/160 |
| 6,142,221 | A | * | 11/2000 | Johansson | 165/140 |
| 6,658,861 | B1 | * | 12/2003 | Ghoshal et al. | 62/3.7 |
| 7,406,835 | B2 | * | 8/2008 | Allen et al. | 62/179 |
| 7,600,391 | B2 | * | 10/2009 | Naik et al. | 62/238.6 |
| 7,789,176 | B2 | * | 9/2010 | Zhou | 180/65.1 |
| 7,797,954 | B2 | * | 9/2010 | Duhme et al. | 62/184 |
| 2002/0162693 | A1 | * | 11/2002 | Mizuno et al. | 180/65.1 |
| 2004/0031592 | A1 | * | 2/2004 | Mathias et al. | 165/104.19 |
| 2006/0053833 | A1 | * | 3/2006 | Martins et al. | 62/507 |
| 2006/0113068 | A1 | * | 6/2006 | Desai et al. | 165/140 |
| 2007/0084238 | A1 | * | 4/2007 | Son et al. | 62/527 |

FOREIGN PATENT DOCUMENTS

| | | |
|---|---|---|
| DE | 4333613 A1 | 4/1994 |
| DE | 19542125 A1 | 5/1996 |

OTHER PUBLICATIONS

Office Action dated Nov. 19, 2010, issued in German Patent Application No. 10 2009 002 424.7-45.

* cited by examiner

*Primary Examiner* — Frantz Jules
*Assistant Examiner* — Joseph Trpisovsky
(74) *Attorney, Agent, or Firm* — Ingrassia Fisher & Lorenz, P.C.

(57) ABSTRACT

A chiller bypass system is provided for deployment onboard a vehicle that includes a battery pack through which a first coolant is circulated. In one embodiment, the chiller bypass system comprises a chiller, a chiller bypass duct fluidly coupled to the battery pack and configured to supply the first coolant thereto, and a chiller bypass valve. The chiller bypass valve includes: (i) a valve inlet fluidly coupled to the battery pack and configured to receive the first coolant therefrom, (ii) a first valve outlet fluidly coupled to the chiller and configured to supply the first coolant thereto, and (iii) a second valve outlet fluidly coupled to the chiller bypass duct and configured to supply the first coolant thereto. The chiller bypass valve selectively directs coolant flow between the first valve outlet and the second valve outlet to adjust the volume of the first coolant cooled by the chiller.

7 Claims, 4 Drawing Sheets

US 8,448,460 B2

VEHICULAR COMBINATION CHILLER BYPASS SYSTEM AND METHOD

TECHNICAL FIELD

The present invention generally relates to a vehicular cooling system and, more particularly, to a combination chiller bypass system suitable for cooling the A/C module and battery pack of an electric or hybrid vehicle.

BACKGROUND

Vehicles are routinely equipped with an air conditioning (A/C) chiller system, which circulates a liquid coolant through the A/C cooler of an air conditioning module (e.g., a heating, ventilation, and air conditioning module) to maintain the A/C cooler below a desired temperature (e.g., 5 degrees Celsius). A representative A/C module chiller system includes a chiller, a recirculation pump, and a series of flow passages fluidly coupling the components of the A/C module chiller system to the A/C cooler. When energized, the pump circulates a liquid coolant (e.g., ethylene glycol) between chiller the A/C cooler. The coolant conductively transfers heat from A/C cooler to the chiller thus cooling the A/C cooler and heating the chiller. The chiller is, in turn, cooled by a refrigeration assembly.

In addition to the A/C module chiller system, hybrid and electric vehicles may be further equipped with a secondary chiller system (the "battery pack chiller system") suitable for cooling the battery pack utilized to power the vehicle's electric motor/generator. As does the A/C chiller system, the battery pack chiller system includes a chiller, a recirculation pump, and a series of flow passages fluidly coupling the components of A/C chiller system to the vehicle's battery pack. During operation, the battery pack chiller system circulates a liquid coolant (e.g., ethylene glycol) between the vehicle's battery pack and the chiller. The liquid coolant conductively transfers heat from the battery pack to the chiller. This results in the cooling of the battery pack and the heating of the chiller, which is subsequently cooled by a refrigeration assembly as described above. By cooling the battery pack in this manner, the battery pack chiller system may maintain the battery pack at or near a desired operating temperature (e.g., 25 degrees Celsius) thus optimizing the battery pack's operational life and performance. Notably, the desired operating temperature of the battery pack is typically considerably higher than the desired operating temperature of the A/C cooler.

Dual chiller cooling infrastructures of the type described above (i.e., infrastructures employing both an A/C chiller system and a separate battery pack chiller system) are capable of adequately cooling a vehicle's A/C module and battery pack; however such dual chiller infrastructures are limited in certain respects. In particular, such dual chiller cooling infrastructures tend to be relatively bulky, weighty, and costly as each chiller system generally requires its own chiller, recirculation pump, plumbing, and other such components.

Accordingly, it is desirable to provide a chiller bypass system suitable for cooling both the A/C module and the battery pack of a vehicle utilizing a single chiller. Preferably, such a chiller bypass system would permit independent regulation of the temperature of the A/C module and the temperature of the battery pack. It would also be desirable to provide a method for operating such a chiller bypass system. Other desirable features and characteristics of the present invention will become apparent from the subsequent detailed description and the appended claims, taken in conjunction with the accompanying drawings and the foregoing technical field and background.

SUMMARY

A chiller bypass system is provided for deployment onboard a vehicle that includes a battery pack configured to have a first coolant circulated therethrough. In one embodiment, the chiller bypass system comprises a chiller, a chiller bypass duct fluidly coupled to the battery pack and configured to supply the first coolant thereto, and a chiller bypass valve. The chiller bypass valve includes: (i) a valve inlet fluidly coupled to the battery pack and configured to receive the first coolant therefrom, (ii) a first valve outlet fluidly coupled to the chiller and configured to supply the first coolant thereto, and (iii) a second valve outlet fluidly coupled to the chiller bypass duct and configured to supply the first coolant thereto. The chiller bypass valve selectively directs coolant flow between the first valve outlet and the second valve outlet to adjust the volume of the first coolant cooled by the chiller.

A method is also provided for regulating the temperature of a battery pack coolant circulated through a battery pack. The method is carried out by a chiller bypass system including a chiller and a chiller bypass duct bypassing the chiller. The chiller bypass system conducts the battery pack coolant between the chiller and the battery pack. The method includes the steps of monitoring the temperature of the battery pack, and diverting a portion of the battery pack coolant through the chiller bypass duct when the temperature of the battery pack is less than a predetermined upper temperature threshold.

DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
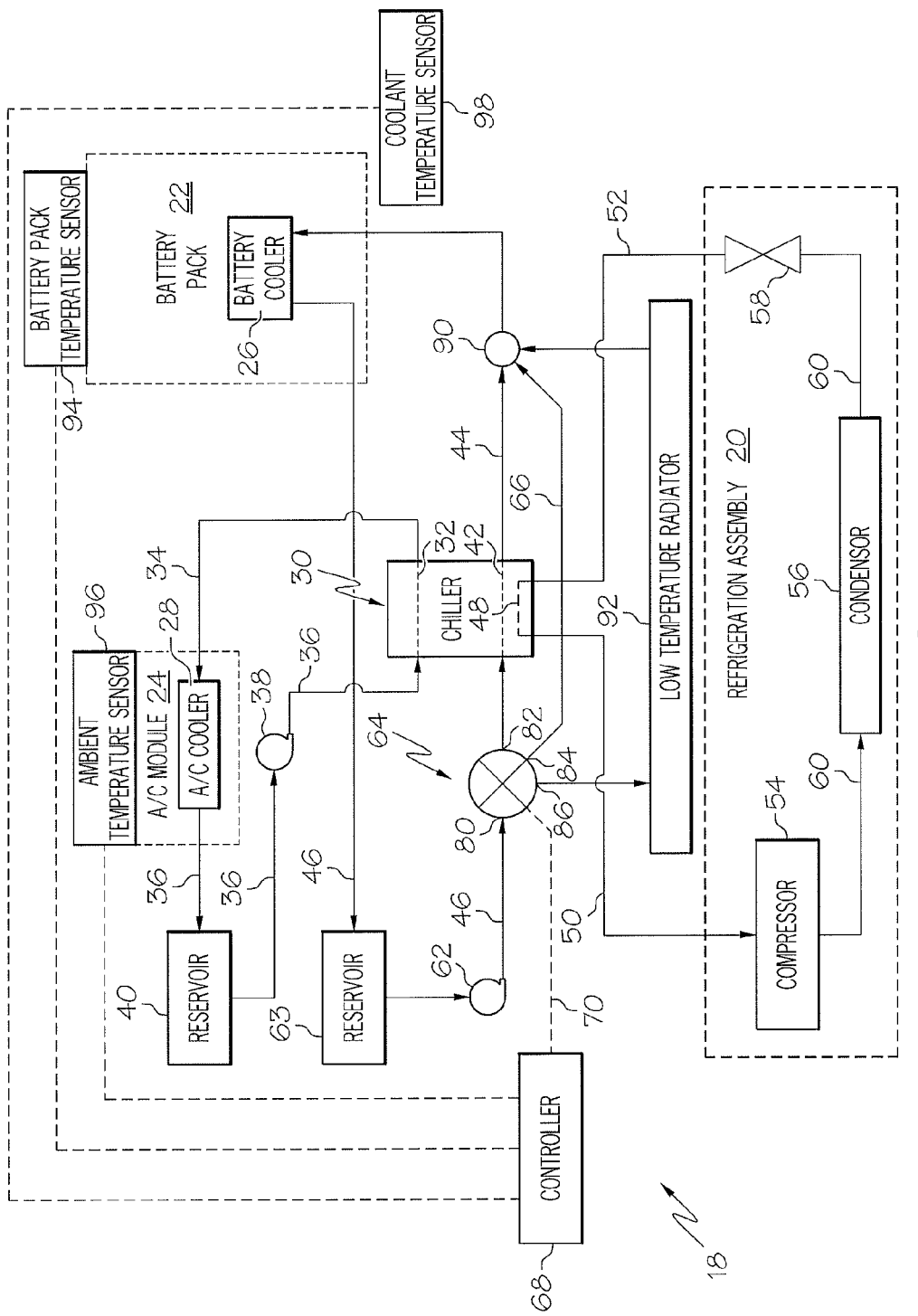
FIG. 1 is a schematic of a combination chiller bypass system suitable for deployment onboard a vehicle, such as an electric or hybrid vehicle, in accordance with an exemplary embodiment.

FIG. 1 is a schematic of a combination chiller bypass system 18 suitable for deployment onboard a host vehicle, such as an electric or hybrid vehicle, in accordance with an exemplary embodiment. In this example, the host vehicle includes a refrigeration assembly 20, a battery pack 22, and an air conditioning (A/C) module 24. A/C module 24 may comprise any device suitable for cooling the passenger cabin of a vehicle. In certain embodiments, A/C module 24 may also provide ventilation and heating functions, although this is by no means necessary. During operation, chiller bypass system 18 circulates a first coolant ("the A/C module coolant") through an A/C cooler 28 provided within A/C module 24 to permit A/C module 24 to provide cool air to the passenger cabin. In addition, chiller bypass system 18 circulates a second coolant ("the battery pack coolant") through a battery cooler 26 provided within battery pack 22 to regulate the temperature of battery pack 22 as described in more detail below. The A/C module coolant and the battery pack coolant may or may not intermix during operation of chiller bypass system 18.

Chiller bypass system 18 comprises a chiller 30 having a plurality of flow passages formed therethrough. In the exemplary embodiment shown in FIG. 1, chiller 30 has three flow passages formed therethrough: (i) a first chiller flow passage 32, (ii) a second chiller flow passage 42, and (iii) a third chiller flow passage 48. For clarity, chiller flow passages 32, 42, and 48 are illustrated in FIG. 1 as simplified dashed lines; however, in actual implementations, chiller flow passages 32, 42, and 48 will have orientations and geometries that are considerably more complex. An example of an actual implementation of chiller 30 is discussed below in conjunction with FIGS. 3-6.

With reference to FIG. 1, chiller flow passage 32 is fluidly coupled to A/C cooler 28 and is configured to exchange the A/C coolant therewith. More specifically, an outlet of chiller flow passage 32 is fluidly coupled to an inlet of A/C cooler 28 by a first conduit 34, and an inlet of flow passage 32 is fluidly coupled to an outlet of A/C cooler 28 by a second conduit 36. A recirculation pump 38 is fluidly disposed in line with second conduit 36 downstream of A/C cooler 28. If desired, and as indicated in FIG. 1, an A/C coolant reservoir 40 may also disposed in line with second conduit 36 downstream of A/C cooler 28 and upstream of recirculation pump 38. When energized, pump 38 circulates the A/C module coolant between A/C cooler 28 and flow passage 32 of chiller 30. While flowing through A/C cooler 28, the A/C module coolant conductively absorbs heat from, and thus cools, A/C cooler 28. The heated A/C module coolant then flows into chiller flow passage 32, and chiller 30 conductively absorbs heat from the coolant. The heat absorbed by chiller 30 is then dissipated to a liquid refrigerant, which is circulated through chiller flow passage 48 by refrigeration assembly 20 as described more fully below.

Second chiller flow passage 42 is fluidly coupled to battery cooler 26 and configured to exchange the battery pack coolant therewith. For example, and as shown in FIG. 1, an outlet of chiller flow passage 42 may be fluidly coupled to an inlet of battery cooler 26 via a first conduit 44, and an inlet of flow passage 42 may be fluidly coupled to an outlet of battery cooler 26 via a second conduit 46. A recirculation pump 62 is fluidly disposed in line with conduit 46 to circulate the battery module coolant between battery cooler 26 and flow passage 42 of chiller 30. The circulating battery pack coolant conductively transfers heat from battery cooler 26 to chiller 30. This results in the cooling of battery pack 22 and the heating of chiller 30, which is subsequently cooled by refrigeration assembly 20 as described below. If desired, a battery coolant reservoir 63 may also be fluidly coupled between the outlet of battery cooler 26 and an inlet of pump 62. Notably, battery coolant reservoir 63 may be combined with A/C coolant reservoir 40 in certain embodiments to produce a single reservoir that conducts both the battery module coolant and the A/C module coolant. Similarly, in certain embodiments, an air separator (not shown) may also be fluidly coupled to both the A/C coolant loop and the battery pack coolant loop.

Third chiller flow passage 48 is fluidly coupled to refrigeration assembly 20 and is configured to exchange a refrigerant therewith. In the exemplary embodiment illustrated in FIG. 1, an outlet of flow passage 48 is fluidly coupled to an inlet of refrigeration assembly 20 via a first conduit 50, and an inlet of chiller flow passage 48 is fluidly coupled to an outlet of refrigeration assembly 20 via a second conduit 52. Refrigeration assembly 20 may comprise any device or system suitable for continually conducting a cooled refrigerant through chiller flow passage 48 to conductively cool chiller 30. By way of example, refrigeration assembly 20 is illustrated in FIG. 1 as a single-stage vapor compression refrigeration system that includes a compressor 54, a condenser 56, and a throttle valve 58. A plurality of conduits 60 join compressor 54, condenser 56, and throttle valve 58 in flow series. Although not shown in FIG. 1 for clarity, refrigeration assembly 20 may also include additional components that are conventionally known, such as various pressure and temperature sensors.

During operation, refrigeration assembly 20 continually supplies the inlet of chiller flow passage 48 with a cooled and partially vaporized refrigerant. As it flows through chiller flow passage 48, the refrigerant further vaporizes and conductively absorbs heat from the body of chiller 30. By absorbing heat in this manner, the refrigerant cools chiller 30 and, therefore, the A/C module coolant flowing through chiller flow passage 32 and the battery pack coolant flowing through chiller flow passage 42. The heated vaporized refrigerant then flows out of flow passage 48, through conduit 50, and into compressor 54. Compressor 54 utilizes a mechanical piston or other such means to compress, and thus superheat, the vaporized refrigerant. The superheated vaporized refrigerant then flows through conduit 60 and into condenser 56, which causes the refrigerant to return to its liquid state. As the vaporized refrigerant changes phase to liquid, heat is released. This heat is dissipated by convectively cooling condenser 56 utilizing an external cooling fluid, such as ambient air. Now in a liquid state, the cooled refrigerant flows into throttle valve 58 wherein an abrupt decrease in pressure causes the refrigerant to partially vaporize. Conduit 52 then directs the cooled and partially vaporized refrigerant back to the inlet of chiller flow passage 48, and the process is repeated.

The cooling demands placed on A/C cooler 28 vary as a user alters the settings of A/C module 24. As the cooling demands placed on A/C module 24 increase, so too do the cooling demands placed on chiller 30. Refrigeration assembly 20 adjusts the cooling of the chiller 30 to accommodate these changing demands. Thus, when there is a relatively high cooling load placed on A/C cooler 28, refrigeration assembly 20 cools chiller 30 to a relatively low temperature to accommodate the high cooling load. When chiller 30 is cooled to such low temperatures, overcooling of the battery pack coolant may occur and battery pack 22 may consequently be cooled to an undesirably low temperature. To avoid this, chiller bypass system 18 is configured to continually adjust the volume of battery pack coolant flowing through the chiller 30 by routing a selected portion of the battery pack coolant around chiller 30 as described in more detail below.

In the exemplary embodiment shown in FIG. 1, chiller bypass system 18 further comprises a chiller bypass valve 64, a chiller bypass duct 66, and a controller 68 operatively coupled to chiller bypass valve 64 (indicated in FIG. 1 by dashed line 70). Chiller bypass valve 64 includes: (i) a valve inlet 80, which is fluidly coupled to an outlet of battery cooler 26 and positioned downstream of recirculation pump 62; (ii) a first valve outlet 82, which is fluidly coupled to the inlet of flow passage 42 of chiller 30; and (iii) a second valve outlet 84, which is fluidly coupled to the inlet of chiller bypass duct 66. Chiller bypass duct 66 is, in turn, fluidly coupled to the inlet of battery cooler 26. More specifically, chiller bypass duct 66 may be fluidly coupled to conduit 44 as indicated in FIG. 1 at 90.

Coolant flowing through chiller bypass valve 64 from valve inlet 80 to valve outlet 82 is directed into flow passage 42 and cooled by chiller 30 before flowing into battery cooler 26. In contrast, coolant flowing through chiller bypass valve 64 from valve inlet 80 to valve outlet 84 is directed into chiller bypass duct 66 and thus circumvents chiller 30 before flowing into battery cooler 26. Controller 68 may move chiller bypass valve 64 between a number of positions to selectively direct coolant between valve outlet 82 and valve outlet 84 to determine the volume of battery pack coolant flowing through chiller flow passage 42 and cooled by chiller 30. By selectively modulating chiller bypass valve 64, controller 68 may adjust the temperature of the battery pack coolant, and consequently the temperature of battery pack 22, without substantially impacting the temperature of the A/C module coolant and, therefore, the temperature of A/C module 24.

Although by no means necessary to regulate the temperature of the battery pack coolant and of battery pack 22, chiller bypass system 18 is preferably further equipped with a secondary cooling source (e.g., a low temperature radiator 92) and chiller bypass valve 64 may further be provided with a third valve outlet 86. Low temperature radiator 92 is fluidly coupled between valve outlet 86 and the inlet of battery cooler 26; e.g., an outlet of radiator 92 may be fluidly coupled to conduit 44 as indicated in FIG. 1 at 90. Controller 68 may command chiller bypass valve 64 to selectively direct coolant through valve outlet 86 and into low temperature radiator 92. Low temperature radiator 92 serves a secondary cooling source by conductively absorbing heat from the coolant and dissipating the absorbed heat to ambient air. Thus, in contrast to chiller 30 and refrigeration assembly 20, radiator 92 may cool the battery pack coolant without utilizing auxiliary electrical components, such as compressor 54. Low temperature radiator 92 consequently provides an energy efficient cooling means for cooling the battery pack coolant. However, unlike chiller 30 and refrigeration assembly 20, the cooling capacity of low temperature radiator 92 is generally dependent upon the difference between the ambient temperature and the temperature of battery pack 22.

It should thus be appreciated that controller 68 may regulate the volume of battery pack coolant cooled by chiller 30 and, therefore, the temperature of battery pack 22, by commanding chiller bypass valve 64 to selectively direct coolant between valve outlets 82 and 84 in the above described manner. Furthermore, in a preferred group of embodiments, controller 68 may also selectively route the battery pack coolant through valve outlet 86 to cool the battery pack coolant utilizing an energy efficient means, namely, low temperature radiator 92. In determining the appropriate chiller bypass valve adjustments, controller 68 may consider a wide variety of operational parameters, which may be monitored by one or more sensors. For example, and as indicated in FIG. 1, combination chiller bypass system 18 may include one or more of the following: (i) a battery pack temperature sensor 94, which is operatively coupled to controller 68 and relates thereto data indicative of the temperature of battery pack 22; (ii) an ambient temperature sensor 96, which is operatively coupled to controller 68 and relates thereto data indicative of the ambient temperature; and (iii) a coolant temperature sensor 98, which is also operatively coupled to controller 68 and relates thereto data indicative of the temperature of the battery pack coolant supplied to the inlet of battery cooler 26. In certain embodiments, battery pack temperature sensor 94 and ambient temperature sensor 96 may be integrated into battery pack 22 and A/C module 24, respectively.

Figure 2:
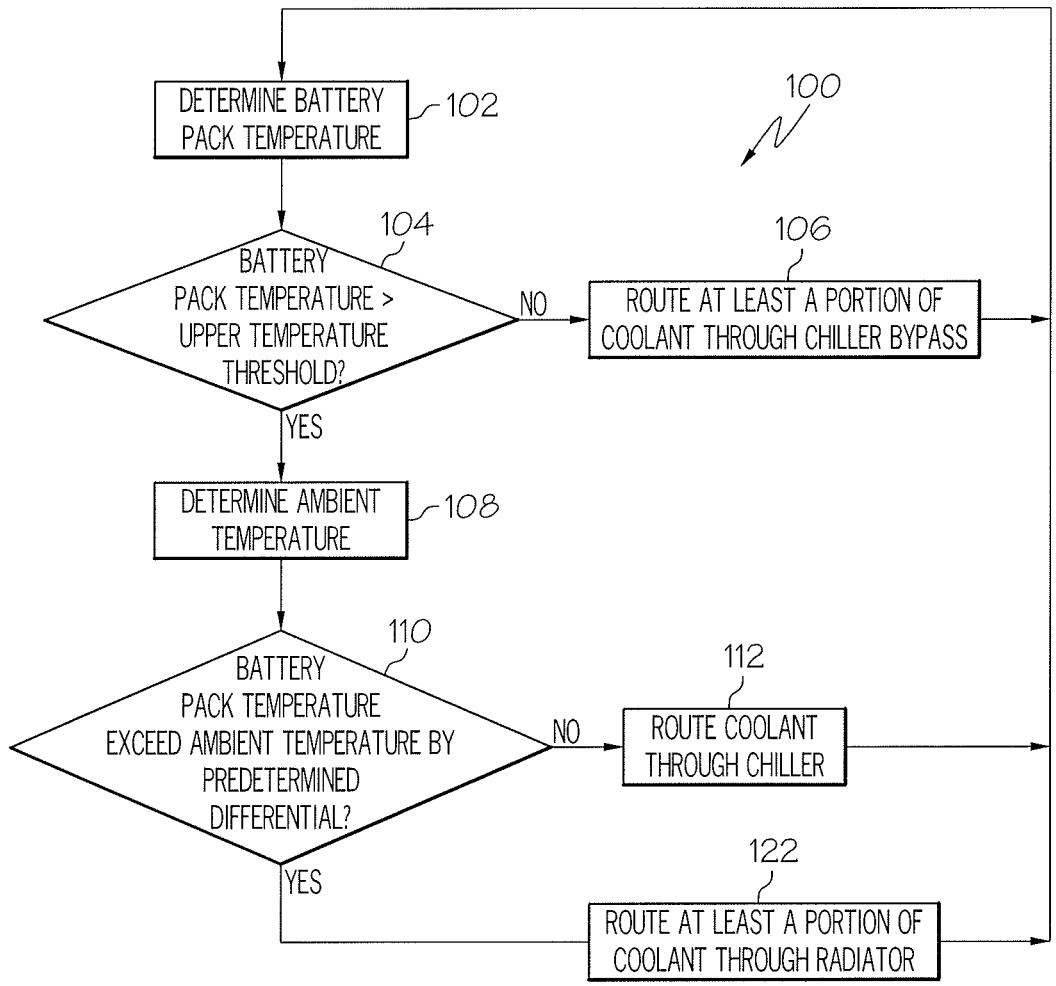
FIG. 2 is a flowchart illustrating an exemplary process that may be carried out by the chiller bypass system shown in FIG. 1.

FIG. 2 is a flowchart illustrating an exemplary process 100 that may be carried out by controller 68 in determining the appropriate manner in which to modulate chiller bypass valve 80. Referring collectively to FIGS. 1 and 2, to commence process 100, controller 68 first determines the temperature of battery pack 22 utilizing battery pack temperature sensor 94 (STEP 102). Controller 68 then compares the temperature of battery pack 22 to a predetermined upper temperature threshold, which may be, for example, 25 degrees Celsius (STEP 104). If the temperature of battery pack 22 is less than or equal to the upper temperature threshold, controller 68 commands chiller bypass valve 64 to move into a position wherein at least a portion of the battery pack coolant is directed through valve outlet 84 and into chiller bypass duct 66 (STEP 106). As indicated above, bypass duct 66 redirects the battery pack coolant around chiller flow passage 42 such that the coolant circumvents further cooling by chiller 30 before flowing into battery pack 22. Controller 68 then returns to STEP 102, and process 100 is repeated.

If, at STEP 104, controller 68 instead determines that the temperature of battery pack 22 exceeds the upper temperature threshold, controller 68 next determines the current ambient temperature utilizing data provided by ambient temperature sensor 96 (STEP 108). Controller 68 then establishes whether the temperature of battery pack 22 exceeds the ambient temperature by at least a predetermined temperature differential, such as 10 degrees Celsius (STEP 110). If the temperature of the battery pack does not exceed the ambient temperature by at least the predetermined temperature differential, controller 68 commands chiller bypass valve 64 to move into a position wherein the battery pack coolant is routed substantially entirely through valve outlet 82 and, thus, through flow passage 42 of chiller 30 (STEP 112). In contrast, if the temperature of the battery pack exceeds the ambient temperature by the predetermined temperature differential, controller 68 commands chiller bypass valve 64 to move into a position wherein at least a portion of the battery pack coolant is routed through valve outlet 86 and, therefore, through low temperature radiator 92 (STEP 114). In either case, controller 68 subsequently returns to STEP 102, and process 100 is repeated.

There has thus been described an exemplary process wherein controller 68 modulates the position of chiller bypass valve 64 based, at least in part, upon the temperature of battery pack 22. In further embodiments, controller 68 may adjust the position of chiller bypass valve 64 based upon other criteria. For example, controller 68 may be configured to adjust the position of chiller bypass valve 64 based upon the temperature of the battery pack coolant applied to the inlet of battery cooler 26 as indicated by coolant temperature sensor 98. In such a case, controller 68 may be configured to direct coolant through valve outlet 82 and into chiller flow passage 42 (or through valve outlet 86 and into low temperature radiator 92) when the inlet coolant temperature is higher than or equal to a predetermined set point, and through valve outlet 84 and into chiller bypass duct 66 when the coolant temperature is lower than the predetermined set point. As a non-limiting example, the predetermined set point may be approximately 25 degrees Celsius to approximately 30 degrees Celsius.

Chiller bypass valve 64 may assume any form for selectively directing coolant flow between a first outlet fluidly coupled to chiller 30, a second outlet fluidly coupled to chiller bypass duct 66, and, perhaps, a third outlet fluidly coupled to a secondary cooling source, such as low temperature radiator 92. In a generalized embodiment, chiller bypass valve 64 includes a flowbody, a valve element movably disposed in the flowbody, and an actuator operatively coupled to the valve element and to controller 68. When commanded by controller 68, the valve actuator moves the valve element to selectively direct coolant flow between the outlets of the flowbody. Chiller bypass valve 64 may be configured to move between first, second, and third stable positions wherein substantially all coolant flow is directed through the first, second, and third outlet, respectively. Alternatively, chiller bypass valve 64 may be adapted to move amongst a wide range of positions so as to apportion or "blend" fluid flow between two or more outlets simultaneously.

Any suitable coolant may be selected for the battery pack coolant and the A/C module coolant including, for example, ethylene glycol. Similarly, any suitable refrigerant may be selected for circulation between refrigeration assembly 20 and chiller 30. A non-exhaustive list of suitable refrigerants includes R134a, R152a, and $CO_2$. This notwithstanding, embodiments of above-described chiller system 18 enable refrigeration assembly 20 and chiller 30 to be disposed outside of the vehicle's passenger cabin. As will be appreciated by one skilled in the art, this permits the usage of certain environmentally-friendly refrigerants, such as R152a, within refrigeration assembly 20 and chiller bypass system 18.

Figure 3:
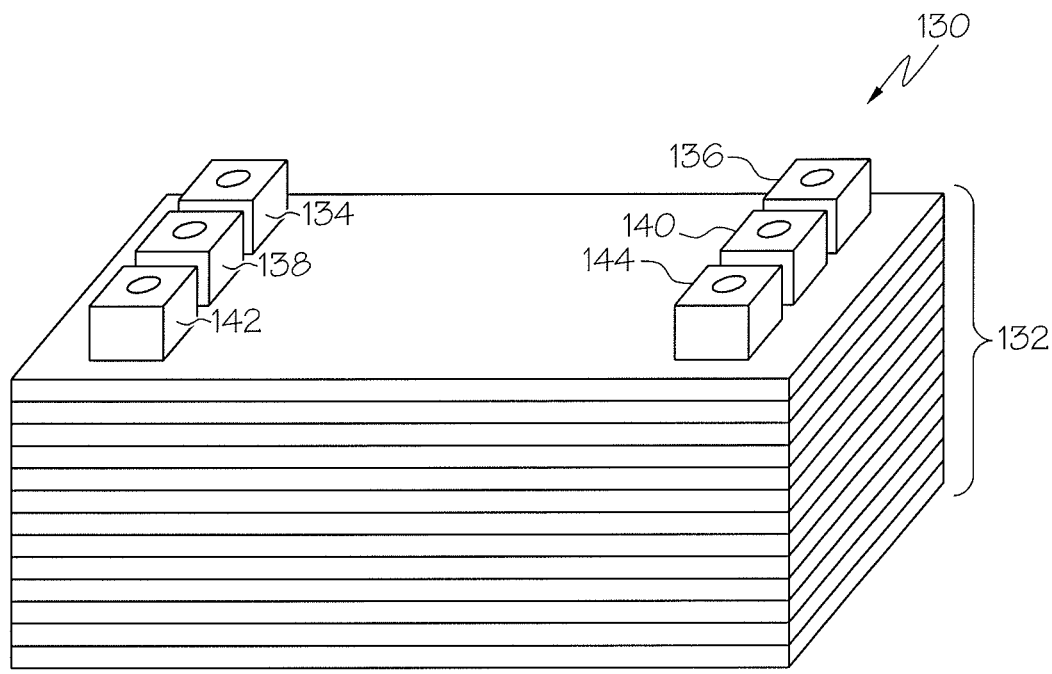
FIG. 3 is an isometric view of an exemplary chiller that may be employed by the chiller bypass system shown in FIG. 1.

Chiller 30 may comprise any thermally-conductive structure suitable for permitting heat exchange between the coolants flowing through flow passages 32 and 42 and the refrigerant flowing through flow passage 48. In a preferred group of embodiments, chiller 30 comprises a plate-type cooler assembly. Further illustrating this point, FIG. 3 is an isometric view of a chiller 130 suitable for use as chiller 30 (FIG. 1). As can be seen in FIG. 3, chiller 130 comprises a plurality of plates 132 (e.g., stainless steel) fixedly joined together in a stacked formation. Plates 132 cooperate to form three independent flow passages as described below in conjunction with FIGS. 4-6. Chiller 130 further includes a battery pack coolant inlet 134, a battery pack coolant outlet 136, an A/C module coolant inlet 138, an A/C module coolant outlet 140, a refrigerant outlet 142, and a refrigerant inlet 144. Notably, the orientation of refrigerant outlet 142 and refrigerant inlet 144 is opposite that of battery pack coolant inlet 134, battery pack coolant outlet 136, A/C module coolant inlet 138, and A/C module coolant outlet 140. The refrigerant flowing through chiller 130 will consequently flow counter to the A/C module coolant and the battery pack coolant, which facilitates heat exchange between the fluids.

Notably, the solid volume of chiller 130 will generally be greater than that of a conventional chiller utilized to cool a single component, such as a single A/C module or a single battery pack. The thermal capacity of chiller 130 is consequently increased relative to such conventional chillers. As a result, chiller 130 may continue to effectively cool the coolants flowing therethrough for a longer duration of time when the refrigeration assembly is inactive due to, for example, hybrid idle.

Figure 4:
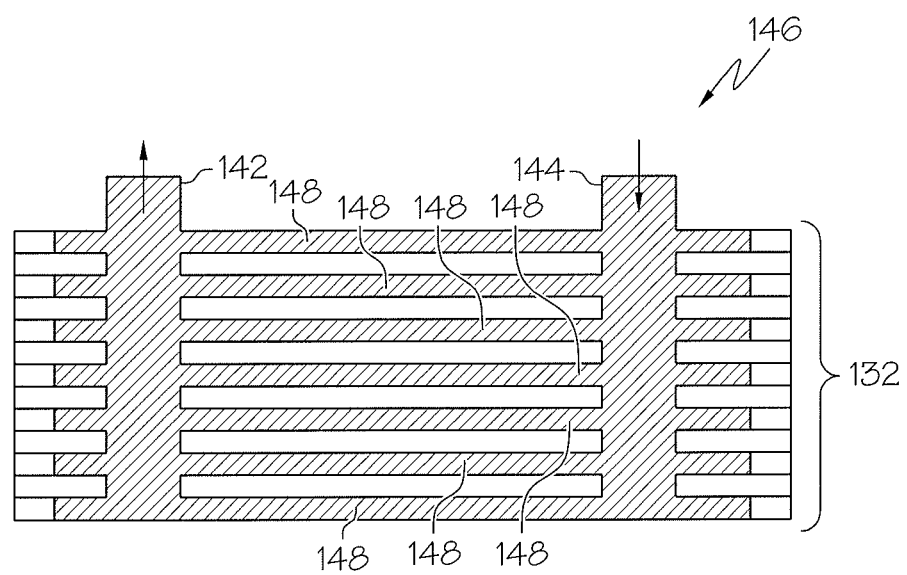
FIGS. 4, 5, and 6 are plan views of first, second, and third flow passages, respectively, formed through the exemplary chiller shown in FIG. 3.

FIG. 4 is a plan view illustrating a first flow passage 146 extending through chiller 130 and fluidly coupling refrigerant inlet 142 to refrigerant outlet 144. First flow passage 146 includes a plurality of lateral segments 148, each of which extends within a different plate 132. In the illustrated example, first flow passage 146 includes seven such lateral segments 148. The geometry and number of lateral segments 148 generally determines the volumetric capacity of flow passage 146 and, therefore, the efficiency with which the refrigerant flowing through flow passage 146 may cool chiller 130.

Figure 5:
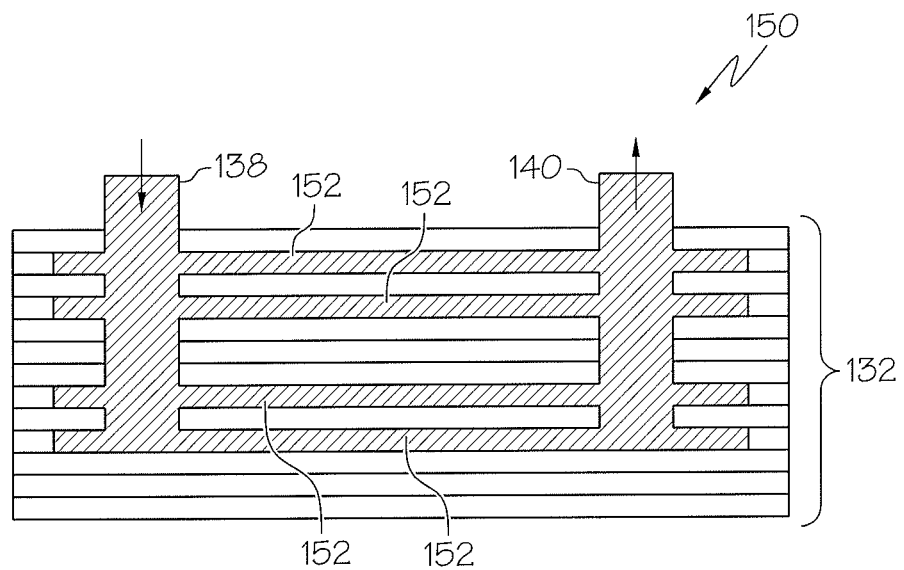

FIG. 5 is a plan view illustrating a second flow passage 150 that extends through chiller 30 to fluidly couple A/C module coolant inlet 138 to A/C module coolant outlet 140. As was the case previously, second flow passage 150 includes a plurality of lateral segments 152, each of which extends within a different plate 132. Lateral segments 152 each have a geometry that is substantially identical to the geometry of each lateral segment 148. However, by comparing FIG. 4 to FIG. 5, it will be noted that there are fewer lateral segments 152 than lateral segments 148; e.g., in this particular example, there are four lateral segments 152 as compared to seven lateral segments 148. As a result, the volumetric capacity of flow passage 150 is less than that of flow passage 146. Thus, during operation, the volume of A/C module coolant flowing through flow passage 150 will be less than the volume of refrigerant flowing through flow passage 146. To maximize heat transfer between the A/C module coolant and the refrigerant, lateral segments 152 of flow passage 150 are preferably interspersed between lateral segments 148 of flow passage 146.

Figure 6:
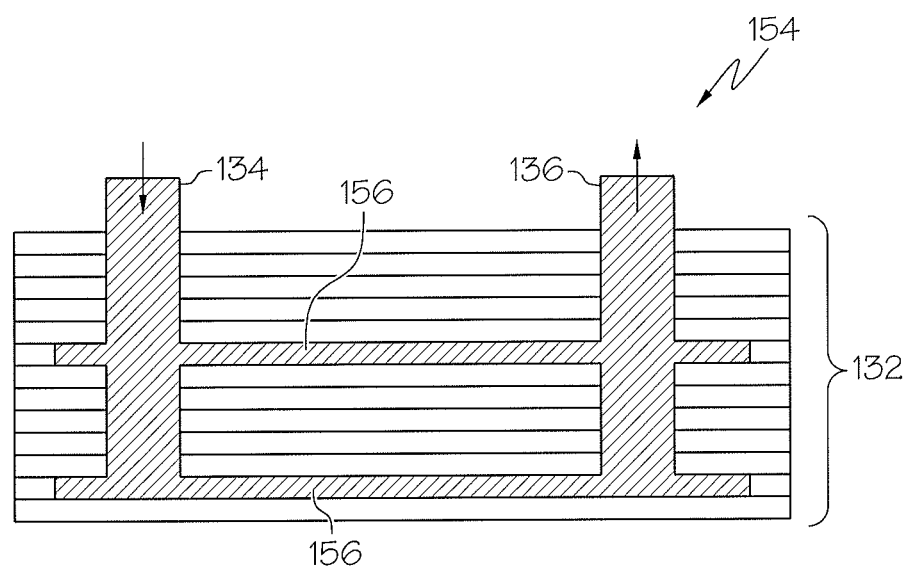

FIG. 6 is a plan view illustrating a third flow passage 154 that extends through chiller 130 to fluidly couple battery pack coolant inlet 134 to battery pack coolant outlet 136. Third flow passage 154 includes a plurality of lateral segments 156, which each extending within a different chiller plate 132. The geometries of lateral segment 156 are substantially identical to those of lateral segments 148 and 152. However, there are fewer lateral segments 156 than lateral segments 148 or lateral segments 152; e.g., there may only be two lateral segments 156 as compared to seven lateral segments 148 and four lateral segments 152. The volumetric capacity of flow passage 154 is thus less than the volumetric capacity of flow passage 150, which is, in turn, less than the volumetric capacity of flow passage 146. Chiller 130 is thus able to hold a greater volume of the A/C module coolant than of the battery module coolant. Consequently, chiller 130 will conductively absorb more heat from the A/C module coolant than from the battery module coolant. As was the case previously, lateral segments 156 of flow passage 154 may be interspersed between lateral segments 148 of flow passage 146 to facilitate heat transfer between the battery pack coolant and the refrigerant.

The foregoing has thus provided at least one exemplary embodiment of a combination chiller bypass system suitable for cooling both the A/C module and the battery pack utilizing a single chiller. Advantageously, the chiller bypass system provides independent temperature regulation for both the A/C module and the battery pack. Furthermore, in certain embodiments, the chiller bypass system employs a secondary cooling source, such as a low temperature radiator, to increase energy efficiency. In addition, there has been provided exemplary embodiments of a method for regulating the temperature of a battery pack coolant circulated through a battery pack that may be carried out by such a chiller bypass system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A chiller bypass system for deployment onboard a vehicle that includes a battery pack configured to have a first coolant circulated therethrough, an air conditioning (A/C) module configured to have a second coolant circulated therethrough, and a refrigeration assembly configured to have a refrigerant circulated therethrough, the chiller bypass system comprising:
    a chiller;
    a chiller bypass duct configured to be fluidly coupled to the battery pack and to supply the first coolant thereto;
    a chiller bypass valve, comprising:
        a valve inlet configured to be fluidly coupled to the battery pack and to receive the first coolant therefrom;
        a first valve outlet fluidly coupled to the chiller and configured to supply the first coolant thereto; and
        a second valve outlet fluidly coupled to the chiller bypass duct and configured to supply the first coolant thereto, the chiller bypass valve configured to selectively direct coolant flow between the first valve outlet and the second valve outlet to adjust the volume of the first coolant cooled by the chiller;
        a third valve outlet;
    a first flow passage formed through the chiller and fluidly coupled to the refrigeration assembly;
    a second flow passage formed through the chiller and fluidly coupled to the A/C module, the volumetric capacity of the second flow passage less than the volumetric capacity of the first flow passage;
    a third flow passage formed through the chiller and fluidly coupled between the battery pack and the first valve outlet, the volumetric capacity of the third flow passage less than the volumetric capacity of the second flow passage; and
    a secondary cooling source fluidly coupled between the third valve outlet and the battery pack.

2. A chiller bypass system according to claim 1 wherein the secondary cooling source comprises a low temperature radiator.

3. A chiller bypass system according to claim 1 further comprising a controller operatively coupled to the chiller bypass valve.

4. A chiller bypass system according to claim 3 further comprising a battery pack temperature sensor operatively coupled to the controller, the controller configured to adjust the position of the chiller bypass valve based, at least in part, upon the temperature of the battery pack as indicated by the battery pack temperature sensor.

5. A chiller bypass system according to claim 3 further comprising a coolant temperature sensor operatively coupled to the controller, the controller configured to adjust the position of the chiller bypass valve based, at least in part, on the temperature of the first coolant as indicated by the coolant temperature sensor.

6. A chiller bypass system according to claim 1 further comprising:
    a controller operatively coupled to the chiller bypass valve; and
    an ambient temperature sensor operatively coupled to the controller, the controller configured to adjust the position of the chiller bypass valve based, at least in part, upon the ambient temperature as indicated by the ambient temperature sensor.

7. A chiller bypass system according to claim 1 wherein the chiller comprises a plurality of plates fixedly coupled together in a stacked formation;
    wherein the first, second, and third flow passages each comprise a number of lateral segments formed in the plurality of plates; and
    wherein the number of lateral segments included in the first flow passage comprises is greater than the number of lateral segments included in the second flow passage and greater than the number of lateral segments included in the third flow passage.

* * * * *